(12) United States Patent
Dickman et al.

(10) Patent No.: US 8,100,457 B2
(45) Date of Patent: Jan. 24, 2012

(54) SEAT SYSTEM FOR THE INTERIOR OF A MOTOR VEHICLE

(75) Inventors: Ryan Dickman, Fairview, OR (US); Mark Hurayt, Tigard, OR (US); Holger Schleife, Stuttgart (DE); Kai Sieber, Portland, OR (US); Justin Yee, Scappoose, OR (US)

(73) Assignee: Daimler AG, Stuttgart (DE)

( * ) Notice: Subject to any disclaimer, the term of this patent is extended or adjusted under 35 U.S.C. 154(b) by 297 days.

(21) Appl. No.: 12/409,933

(22) Filed: Mar. 24, 2009

(65) Prior Publication Data

US 2010/0244512 A1 Sep. 30, 2010

(51) Int. Cl.
*B60N 2/04* (2006.01)
*A47C 1/00* (2006.01)
(52) U.S. Cl. .................... 296/65.03; 297/344.1
(58) Field of Classification Search ............. 297/344.1, 297/217.1, 217.7; 296/65.03, 65.11, 65.12, 296/65.01; 248/503.1
See application file for complete search history.

(56) References Cited

U.S. PATENT DOCUMENTS

| | | | |
|---|---|---|---|
| 6,267,430 B1 * | 7/2001 | Cresseaux | 296/65.13 |
| 6,692,051 B1 * | 2/2004 | Cook et al. | 296/24.39 |
| 7,070,223 B2 * | 7/2006 | Jeong | 296/65.03 |

FOREIGN PATENT DOCUMENTS

DE 43 04 398 A1 8/1993

* cited by examiner

*Primary Examiner* — Milton Nelson, Jr.
(74) *Attorney, Agent, or Firm* — Crowell & Moring LLP

(57) ABSTRACT

A seat system for the interior of a motor vehicle, such as a driver's cab of a truck, has a vehicle seat that is movable from a home position, set on a seat support on the vehicle, into at least one further position. The vehicle seat is separable from the seat support and has a roller element device by which the vehicle seat can be moved into a position separated from the seat support. The seat support can include at least one coupling element for a connection line, with the coupling element being connectable to a coupling element on the vehicle seat.

12 Claims, 2 Drawing Sheets

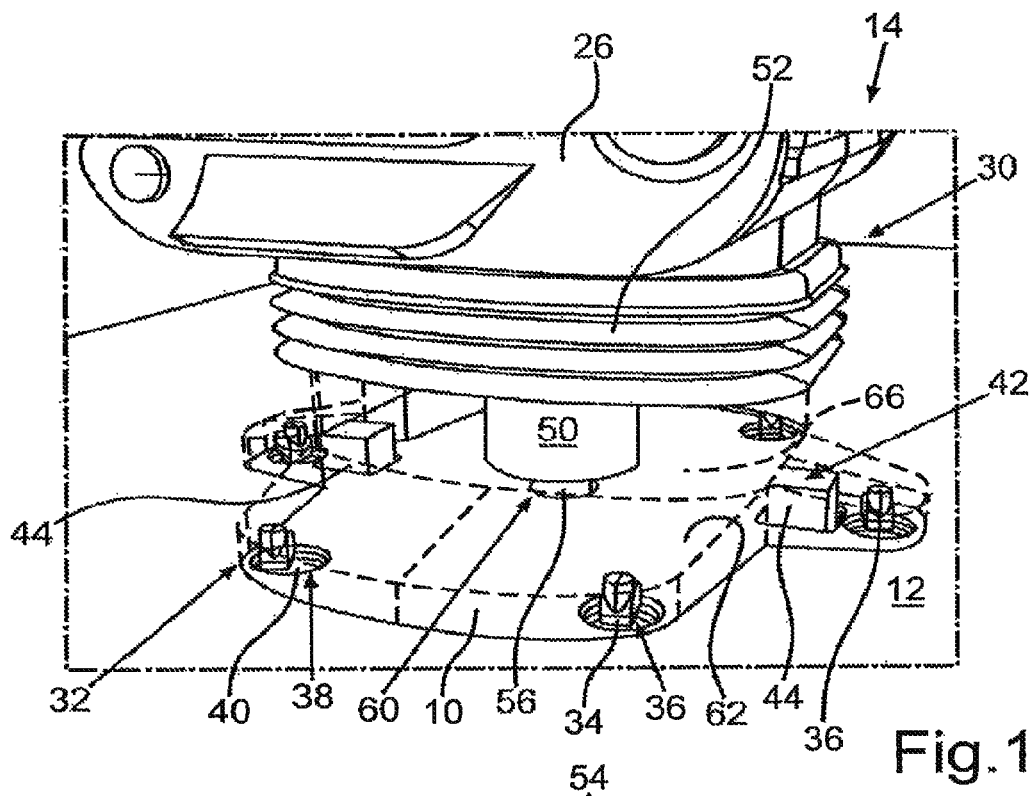
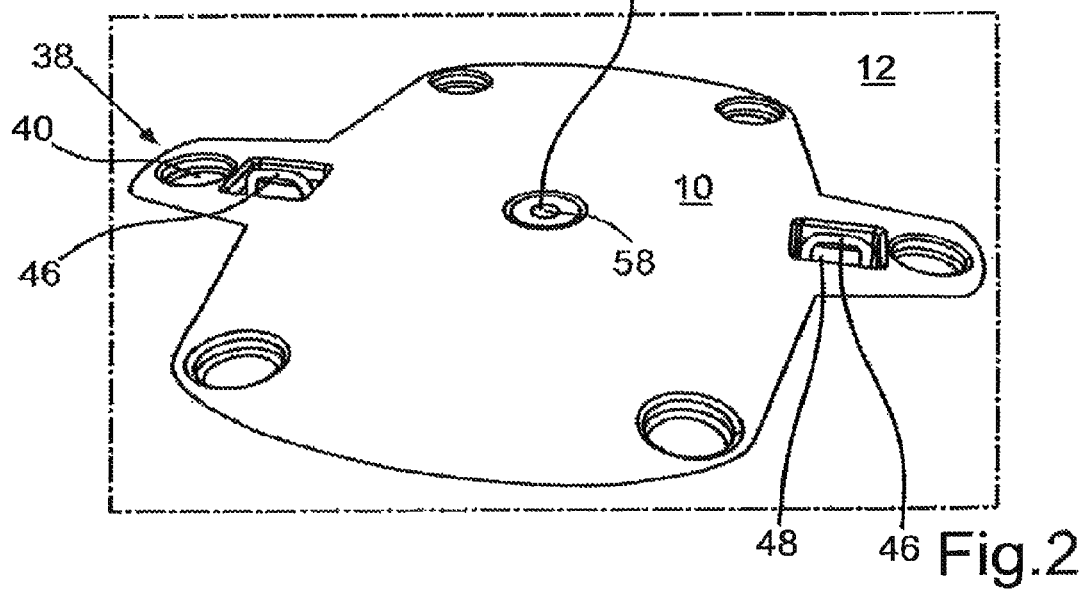

SEAT SYSTEM FOR THE INTERIOR OF A MOTOR VEHICLE

CROSS REFERENCE TO RELATED APPLICATIONS

Cross reference is hereby made to commonly assigned U.S. patent application Ser. No. 12/410,826 titled Seat System for the Interior of a Motor Vehicle, and commonly assigned U.S. patent application Ser. No. 12/411,848 titled Interior Equipment for a Motor Vehicle Interior.

BACKGROUND AND SUMMARY OF THE INVENTION

This invention relates to a seat system for the interior of a motor vehicle, in particular for a driver's cab of a truck, including a seat support on the vehicle, and a vehicle seat separable from the seat support and movable from a home position, set on the seat support on the vehicle, into at least one further position.

A seat system of this kind, already known from German document DE 43 04 398 A1, includes a vehicle seat that is movable from a home position, set on a seat support fixed to the floor and located on the vehicle, into a position that is rotated through approximately 90° in relation thereto. The seat support includes, as an essential component, a guide tube, which is fixed to the vehicle floor and which has an axis that forms the pivot axis of the vehicle seat, about which the latter can be displaced out of its home position into a position rotated through 90°.

In this seat system, while it is possible to displace the vehicle seat, the possibilities for varying utilization of the interior remain markedly limited.

One object of the present invention is therefore to provide a seat system, of the type mentioned at the outset, with which the possibilities for variation in the interior of the motor vehicle can be increased.

This object is achieved according to the invention by way of a vehicle seat that has a roller element device by which the vehicle seat can be moved into a further position and separated from the seat support, as well as by way of providing at least one coupling element for a connection line on the seat support that is connectable to a coupling element on the vehicle seat. Advantageous embodiments of the invention having effective and non-trivial further developments are also claimed.

To provide a seat system by way of which the interior of the motor vehicle can be utilized in a markedly more variable way, again, according to the invention, the vehicle seat is separable from the seat support and has a roller element device by way of which the vehicle seat can be moved into a position separated from the seat support. Unlike the prior art according to German document DE 43 04 398 A1, in which, although the vehicle seat can be displaced, there is always a connection with the seat support in the form of the guide tube comprising the pivot axis, with the seat system according to the present invention, the vehicle seat can be completely separated from the seat support. Once separated from the seat support, the vehicle seat may thus be brought into an at least largely freely selectable position within the interior of the motor vehicle by way of the roller element device. Since it is possible to completely separate the vehicle seat and the seat support, the seat does not need a complex bearing and/or guide mechanism for displacing the vehicle seat, which would take up a considerable amount of space. Rather, the complete separation and mobility of the vehicle seat permit use of a relatively simple seat support that takes up almost no space and that does not restrict the free mobility of passengers within the vehicle interior.

Another advantage of a simply constructed seat support lies in the fact that, overall, a seat system that is relatively inexpensive can be provided.

In a further embodiment of the invention, it is advantageous if the seat support includes a receiving means by means of which the roller element device of the vehicle seat may be received in the home position thereof. This has the advantage that a user locates the home position of the vehicle seat on the seat support in a simple manner in order to fasten it in the home position accordingly.

It is also advantageous if the receiving means includes respective receivers, or depressions, in which a respectively corresponding roller element of the roller element device of the vehicle seat can be received in its home position. Receivers or depressions of this kind may be made in a particularly simple form, with the result that the roller elements correspondingly abut against the receivers or depressions and/or are lodged in therein.

It is also advantageous if the roller elements of the roller element device are provided with covers that extend at least approximately as far as the floor of the interior of the motor vehicle. This ensures that objects lying on the floor of the interior cannot block the roller elements but, rather, are pushed away accordingly by the covers.

In a further embodiment of the invention, a locking device is provided between the vehicle seat and the seat support. This device is locked to secure the home position of the vehicle seat, and may be unlocked for moving the vehicle seat into the further position, with the vehicle seat completely released from the seat support. As a result of the locking device, the vehicle seat, which has preferably been pre-positioned in the home position by the receiving means, can thus be simply fastened to the seat support, which for its part is set on the floor. Once the locking is released, the vehicle seat is freely movable in relation to the seat support; that is to say that preferably there is no connection of any kind between the seat support and the vehicle seat.

In a further embodiment of the invention, the locking device has, on the vehicle seat, displaceable locking means, which cooperate with corresponding locking means on the seat support. In other words, locking means including forked catches can be arranged on the vehicle seat, and respective closing hoops can be used as locking means on the seat support. This has the advantage that locking means of simple construction can be provided on the seat support. When the vehicle seat is not in the home position, the locking means are correspondingly resistant to external influences such as vehicle passengers stepping on them.

A further preferred embodiment provides for the seat support to be constructed at least approximately flush with the floor of the interior of the motor vehicle. In this way, the vehicle seat can be moved away from the seat support and pushed over the floor of the interior in a particularly simple way by means of the roller element device.

In a further embodiment of the invention, the seat system includes a control device that communicates with the motor vehicle. Thus, it is conceivable for the locking device to be controllable between the vehicle seat and the seat support by means of the control device. In this way, it is possible, when the locking device is in the home position of the vehicle seat, for the device only to be releasable when the motor vehicle is not being driven. A number of other constructions are conceivable here, as a function of which locking of the vehicle seat to the seat support is performed or can be canceled.

In order to provide a seat system of the type mentioned at the outset with increased possibilities for variation, at least one coupling element for a connection line can be provided in the seat support. This coupling element is connectable to a coupling element on the vehicle seat, or connected in the home position. In other words, according to the invention, mutually corresponding coupling elements can be provided on the vehicle seat and the seat support respectively, with the result that when the home position is released and the seat support is separated, the vehicle seat can be completely separated from the latter. Thus, according to the invention, it is possible for the vehicle seat no longer to be connected in any way to the seat support when it is in the position separated therefrom. Rather, the vehicle seat is movable completely freely within the interior of the motor vehicle. It will be seen that, unlike the prior art, in which a plurality of connection lines to the vehicle seat are conventionally required, this constitutes a substantial simplification. Connection lines that were present previously could not in fact be disconnected, with the result that the free mobility of the vehicle seat after it had been released from its home position was markedly limited. There was also a problem that any corresponding connection lines could be kinked, clamped, twisted, or similarly damaged.

In a further embodiment of the invention, the supply line can take the form of a compressed air line, an electrical power line, or a signal line. With these supply lines, it has been found particularly advantageous if they can be completely separated and thus can no longer impede the free mobility of the vehicle seat beyond the home position.

In this context, a particularly simple coupling can be achieved if at least one coupling element is arranged on an upper side of the seat support, facing the vehicle seat. This upper side provides a particularly simple means of coupling to the coupling element on the vehicle seat.

It is furthermore advantageous if the at least one coupling element on the seat support and the corresponding coupling element on the vehicle seat are arranged to be congruent with one another in the home position of the latter. Thus, when the vehicle seat is put into its home position, a simple or automatic coupling of the respective coupling elements of the corresponding connection line can be achieved.

Further advantages, features, and details will become apparent from the description below of a preferred exemplary embodiment and from the drawings.

BRIEF DESCRIPTION OF THE DRAWINGS

FIG. 1 is a perspective side view of a seat system for the interior of a motor vehicle, taking the form of a driver's cab of a truck, in which a vehicle seat and its seat substructure are shown in a home position that is set on a seat support on the vehicle, in which the seat substructure is represented as partly transparent, as a result of which a roller element device by means of which the vehicle seat is movable into a position separated from the seat support and the home position is visible, and in which the vehicle seat is locked to the seat support in the home position;

FIG. 2 is a perspective view of the seat support of the seat system according to FIG. 1, in which the vehicle seat is not illustrated and so it can be seen that the seat support is constructed to be at least approximately flush with the floor of the interior of the motor vehicle, in which the seat support has a receiving means which includes a plurality of (in the present case, six) receivers in the form of depressions in which it is possible to receive a respectively corresponding roller element of the roller element device of the vehicle seat in the home position of the latter, in which, of the locking device, two locking means which are formed as closing hoops on the seat support are visible, and in which a coupling element for a connection line in the form of a compressed air line is provided centrally in the seat support, this connection line being connectable to a coupling element on the vehicle when the vehicle seat is in the home position;

DETAILED DESCRIPTION OF THE INVENTION

FIG. 1 shows, in perspective, a seat system for the interior of a motor vehicle, in the present case a driver's cab of a truck. The present seat system may also be used, however, not only in driver's cabs of trucks, but equally well in cars, transporters, or other motor vehicles.

The seat system includes a seat support 10, which is shown in a detailed diagrammatic perspective view in FIG. 2, and which is constructed to be at least substantially or approximately flush with the floor 12 of the interior of the driver's cab of the truck. The seat support 10 is, in the present case, substantially a plate element that is formed for example from plastic material, sheet metal, or the like.

Figure 3:
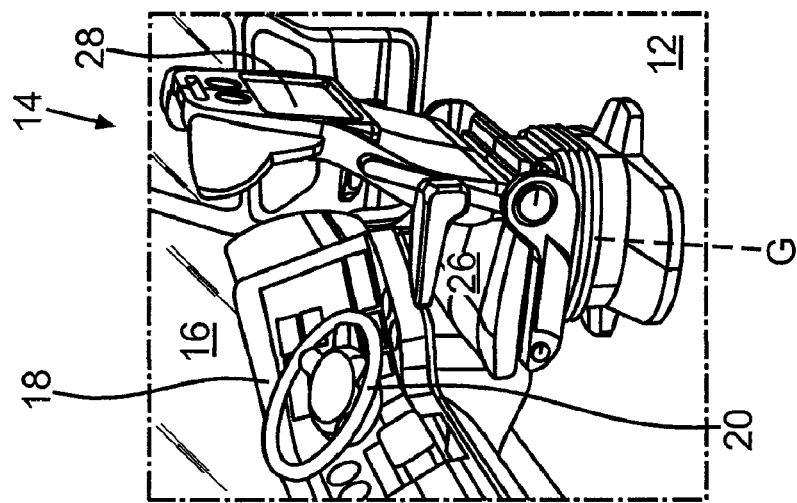
FIG. 3 is a perspective view of the seat system within the driver's cab of the truck, in which the vehicle seat is in its home position or driving position, in which the seat serves as the driving seat for the driver of the truck, and in which the vehicle seat is connected to the seat support by way of a locking device.
Figure 4:
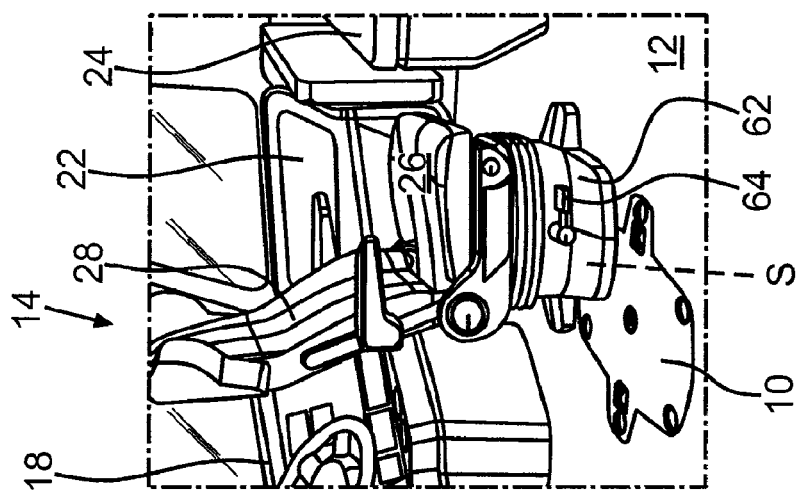
FIG. 4 is a perspective view of the seat system in the interior of the driver's cab of the truck similar to FIG. 3, in which the vehicle seat is in a position separated from the seat support, and in which the locking device has been released and the vehicle seat has been moved accordingly by means of the roller element device.
Figure 5:
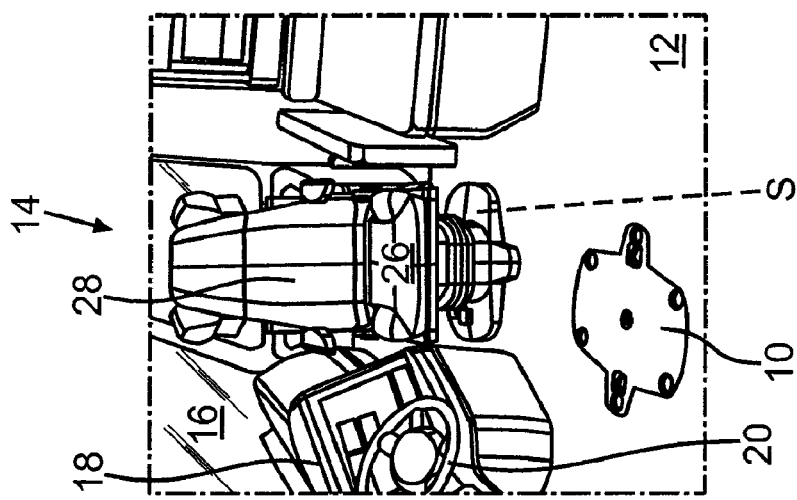
FIG. 5 is a further perspective view of the seat system within the interior of a driver's cab of the truck similar to FIGS. 3 and 4, in which the vehicle seat is in a further position separated from the home position, in the region of a passenger's side of the driver's cab.

In addition to the seat support 10, the seat system includes as an essential component a vehicle seat 14 that is shown in its entirety in FIGS. 3 to 5. In this context, each of FIGS. 3 to 5 shows a view of the interior of the driver's cab of the truck in which there is visible, in addition to the vehicle seat 14, an instrument panel 18 that is arranged rearward of a windshield 16 and having, arranged in the region thereof, a steering wheel 20, a door 22 on the passenger's side, and a lying surface 24.

FIG. 3 shows the vehicle seat 14 in its home position G, in which it can be utilized by the driver of the truck as a driving seat. This home position G is also shown in FIG. 1.

In conjunction with FIG. 1, it is clear here that the vehicle seat 14 includes, in addition to a seat part 26 and a backrest part 28, a seat substructure 30. This seat substructure 30 is made transparent, in some regions in FIG. 1, for the sake of clarity.

The seat substructure 30 of the vehicle seat 14 includes—as is visible from FIG. 1—a roller element device 32 having a plurality of (in the present case, six) roller elements 34, which are mounted by way of a corresponding mountings 36 and simultaneously rotatable in relation to the seat substructure 30 about an axis extending in the upright direction of the vehicle. The roller elements 34 are thus on the one hand in the form of rollers and on the other are also rotatable around an axis extending in the upright direction of the vehicle, with the result that a roller element device 32 in the manner of an office chair is produced.

The roller element device 32 that is described in conjunction with FIG. 1 may in this context be received, in the home position G of the vehicle seat 14, in a receiving means 38 of the seat support 10. To be more precise, this receiving means 38 includes a number of receivers 40 that matches the number of roller elements 34, in the form of depressions within the seat support 10, which are adapted in their orientation and spacing to the position of the roller elements 34. Consequently, when the vehicle seat 14 is pushed over the seat support 10 and oriented in the home position in relation to the seat support 10, the roller elements 34 of the roller element device 32 are received within the respective depressions or receivers 40 of the receiving means 38 in the manner shown in FIG. 1. The depressions or receivers 40 thus give the occupant of the seat a stop point once the vehicle seat 14 has reached the home position G, namely when the roller elements 34 have lodged in the depressions or receivers 40.

The actual fixing of the vehicle seat 14 in the home position is then performed by means of a locking device 42, which includes locking means 44 on the vehicle seat 14. These locking means 44 cooperate with corresponding locking means 46 on the seat support 10. In the present case, the locking means 44 on the vehicle seat are constructed in the manner of forked catches that can be moved appropriately from a closed position into an open position in order to release the locking. Corresponding with the locking means 44 on the vehicle seat are the respective locking means 46 on the seat support 10, which in the present case are constructed as respective closing hoops. The closing hoops 46 are in this context and in the present case received in respective depressions 48, so that the planar surface of the seat support 10 is not substantially adversely affected by the closing hoops 46. It is clear that the locking device 32 may also be of a different construction. Similarly, the receiving means 38 may also be of a different construction from the depressions or receivers 40, for example being appropriate stopper strips or the like.

It is thus clear, considering FIGS. 1 and 2 together, that once the home position G has been reached, and the respective roller elements 34 of the roller element device 32 are received in the corresponding receivers 40 of the receiving means 38, the vehicle seat 14 is set on the seat support 10 and so fastening of the vehicle seat 14 within the interior of the driver's cab can be performed by locking the locking device 42 accordingly. As a result of this, the vehicle seat 40 is arranged relatively fixed within this interior of the driver's cab, with the result that in the event of a collision it is suitable for absorbing the forces produced by the accident.

The seat support 10 itself could in this context where appropriate be constructed to be displaceable in relation to the interior of the motor vehicle, for example by way of seat length adjustments, in order thus to be able to adjust the spacing between the vehicle seat 14 and the instrument panel 18 or the steering wheel 20.

Moreover, it is clear from FIG. 1 that, in the present case, there is provided, in the region of the seat substructure 30, an air spring 50 by means of which the height of the vehicle seat 14, and particularly the seat part 26 thereof, can be adjusted. To adjust the seat height, the seat substructure 30 is provided in a region 52 with a bellows-type element by means of which the different heights can be compensated.

FIG. 2, it can be seen that there is provided on the seat support 10 a coupling element 54 that is connectable to a coupling element 56 on the vehicle seat 14 or is connected thereto in the home position G. It can be seen that the coupling element 54 in the present case is arranged in a central region of the seat support 10. Similarly, the coupling element 56 is arranged in a central region of the seat substructure 30 of the vehicle seat 14. The coupling elements 54, 56 are arranged on the respective components 10, 14 such that, in the home position G of the vehicle seat 14, they lie directly above one another and thus can be coupled to one another in a simple manner. This coupling may be performed automatically when the home position is reached. A separate coupling procedure is also conceivable. As a result of being coupled, the coupling elements 54, 56 complete a connection line 58, and the air spring 50 within the vehicle seat 14 can be supplied with air in the home position G in order thereby to be able to perform height adjustment or spring mounting and damping.

It also is possible to provide other coupling elements, for example electrical power lines or signal lines, between the seat support 10 and the vehicle seat 14. In this context, it can be seen from FIG. 2 that the coupling element 54 is arranged on an upper side 60 of the seat support 10, which faces the vehicle seat 14. Accordingly, the coupling element 56 of the vehicle seat 14 is arranged on a lower underside of the seat substructure 30. This makes it possible for no hoses, lines, or the like of any kind to be needed to connect the seat support 10 to the vehicle seat 14 in the home position G.

FIG. 3 shows, in a manner similar to FIG. 1, the home position G of the vehicle seat 14, in which the latter is in driving operation. The vehicle seat 14 can in the present case be constructed as an integral seat; that is to say, the seatbelt is accordingly secured directly to the backrest part 28.

FIG. 4, by contrast, shows a further position S of the vehicle seat 14, which is achieved by releasing the locking device 42 and pushing the vehicle seat 14 away from the seat support 10—at least partly—by means of the roller element device 32. The vehicle seat 14 has in this case been rotated through approximately 180°. It is clear that the roller elements 34 have, for this purpose, been disengaged from the receivers 40. Since the seat support 10 extends approximately flat or at the same height as the floor 12 of the interior of the driver's cab, it is possible to move the vehicle seat 14 by means of the roller element device 32 without problems.

It is furthermore clear from FIG. 1 that the roller elements 34 are covered by respective covers 62, which extend down at least approximately as far as the floor 12 or the seat support 10. The covers 62 thus extend almost as far as the rolling plane of the individual roller elements 34. In other words, the roller elements 34 have only a minimal amount of free run to overcome the travel resistance of the floor 12. As a result of this, it is possible for the covers 62 to push away obstacles on the floor 12 before the roller elements 32 roll over them. However, this construction of the covers 62 and roller elements 34 is not absolutely necessary, and only represents a preferred embodiment.

FIG. 5 is an illustration in which the vehicle seat 14 has been pushed to the passenger's side of the interior. Appropriate guide elements or stopper elements may be provided on the floor 12 so that a maximum pushing movement of the vehicle seat 14 is stopped in good time before it can be pushed out of a door opening.

Also shown in FIG. 4 is an actuation lever 64, by means of which the locking devices 42 may be actuated for setting the home position G of the vehicle seat 14 or for canceling this home position G. However, it is also possible for the setting or canceling of locking to be performed automatically or in another way. It is also possible for the final coupling of the coupling elements 54, 56 to be performed manually, automatically, or purely mechanically by putting the coupling elements 54, 56 in a position precisely above one another.

Finally, FIG. 1 shows a control device 66 only in an extremely diagrammatic illustration. This control device 66 may serve to control the locking device 42 between the vehicle seat 14 and the seat support 10. For example, it is conceivable for the control device 66 to communicate with the motor vehicle such that it is only possible to release the locking device 42 when the vehicle is in the switched-off condition, or an engine of the motor vehicle has been switched off.

Because in the present case the vehicle seat 14 is arranged fixed in relation to the seat support 10, seat length adjustment can be performed within the seat part 26 in the longitudinal direction of the vehicle by means of two telescopic rails that are arranged underneath the seat cushion. Other possibilities for adjustment in the region of the seat substructure 30 are also conceivable.

Although modifications and changes may be suggested by those skilled in the art, it is the intention of the inventors to embody within the patent warranted hereon all changes and modifications as reasonably and properly come within the scope of their contribution to the art.

We claim:

1. A motor vehicle having a seat system for an interior of the motor vehicle, the seat system comprising:
   a seat support disposed substantially flush with a floor of the vehicle,
   a vehicle seat that is separable from the seat support and movable from a home position, set on the seat support, into at least one further position, and
   at least one coupling element for a connection line provided on the seat support, said at least one coupling element being connectable to a coupling element on the vehicle seat,
   wherein the vehicle seat has a roller element device by which the vehicle seat can be moved into said further position and separated from the seat support, and
   wherein the roller element device includes roller elements receivable in depressions within said seat support that give an occupant of the seat a stop point when the vehicle seat has reached the home position.

2. The motor vehicle as claimed in claim 1, wherein the interior is an interior of a driver's cab for a truck.

3. The motor vehicle as claimed in claim 1, wherein the connection line is a compressed air line, an electrical power line, or a signal line.

4. The motor vehicle as claimed in claim 1, wherein the at least one coupling element is arranged on an upper side of the seat support, facing the vehicle seat.

5. The motor vehicle as claimed in claim 1, wherein the at least one coupling element on the seat support and the coupling element on the vehicle seat are arranged to be congruent with one another in the home position of the vehicle seat.

6. The motor vehicle as claimed in claim 1, wherein the roller elements are received in the depressions when the vehicle seat is in the home position.

7. The motor vehicle as claimed in claim 6, wherein the roller elements are displaced from the depressions when the vehicle seat is moved out of the home position.

8. The motor vehicle as claimed in claim 7, further comprising covers that extend at least approximately as far as the floor of the vehicle and cover the roller elements.

9. The motor vehicle as claimed in claim 1, further comprising a locking device provided between the vehicle seat and the seat support, the locking device being lockable in the home position of the vehicle seat and unlockable for movement of the vehicle seat into the further position, with the vehicle seat completely released from the seat support.

10. The motor vehicle as claimed in claim 9, wherein the locking device has, on the vehicle seat, a displaceable locking arrangement, which cooperates with a corresponding locking arrangement on the seat support.

11. A motor vehicle as claimed in claim 9, further comprising a control device that communicates with the motor vehicle.

12. The motor vehicle as claimed in claim 11, wherein the locking device is controllable between the vehicle seat and the seat support by way of the control device.

* * * * *